US011989841B2

(12) United States Patent
Onose

(10) Patent No.: US 11,989,841 B2
(45) Date of Patent: May 21, 2024

(54) OPERATION SYSTEM FOR INDUSTRIAL MACHINERY

(71) Applicant: FANUC CORPORATION, Yamanashi (JP)

(72) Inventor: Nao Onose, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 18 days.

(21) Appl. No.: 17/799,715

(22) PCT Filed: Feb. 17, 2021

(86) PCT No.: PCT/JP2021/005982
§ 371 (c)(1),
(2) Date: Aug. 15, 2022

(87) PCT Pub. No.: WO2021/166973
PCT Pub. Date: Aug. 26, 2021

(65) Prior Publication Data
US 2023/0062991 A1 Mar. 2, 2023

(30) Foreign Application Priority Data

Feb. 19, 2020 (JP) ................. 2020-025897

(51) Int. Cl.
*G06T 15/00* (2011.01)
*G06F 3/01* (2006.01)
(Continued)

(52) U.S. Cl.
CPC ........... *G06T 19/006* (2013.01); *G06F 3/017* (2013.01); *G06F 3/0346* (2013.01)

(58) Field of Classification Search
CPC ........ G06F 3/011; G06F 3/017; G06F 19/006; G06F 3/0346; G05B 19/409;
(Continued)

(56) References Cited

U.S. PATENT DOCUMENTS 11,721,195 B2 * 8/2023 Stenning .................. F16P 3/00
340/679
2021/0157312 A1 * 5/2021 Cella .................. G01M 13/045
(Continued)

FOREIGN PATENT DOCUMENTS

JP 2008-40832 2/2008
JP 2015-60579 3/2015
(Continued)

OTHER PUBLICATIONS

Cerlinca TI, Pentiuc SG, Vlad V. Real-time 3D hand gestures recognition for manipulation of industrial robots. Elektronika ir Elektrotechnika. Jan. 28, 2013;19(2):3-8.*
(Continued)

*Primary Examiner* — Phu K Nguyen
(74) *Attorney, Agent, or Firm* — Wenderoth, Lind & Ponack, L.L.P.

(57) ABSTRACT

An operation system for industrial machinery comprises: an information acquisition unit which acquires machine identification information corresponding to an industrial machine; a machine identification unit which identifies the industrial machine on the basis of the acquired machine identification information; a model projection unit which projects a model corresponding to the identified industrial machine into a virtual space; a distance/direction calculation unit which calculates the distance and direction, of a user observing the model, with respect to the projected model; a gesture observation unit which observes the gesture of the user as an instruction from the user to the identified industrial machine; an instruction determination unit which determines whether or not a user can give an instruction; and an operation instruction unit which operates the identified industrial machine on the basis of the observed gesture of the user, when the determination result is positive.

5 Claims, 7 Drawing Sheets

(51) Int. Cl.
*G06F 3/0346* (2013.01)
*G06T 19/00* (2011.01)

(58) Field of Classification Search
CPC .......... G05B 2219/39451; G05B 2219/35444; G05B 2219/39449; G05B 2219/32014; B25J 9/1656
USPC ........................................................ 345/418
See application file for complete search history.

(56) References Cited

U.S. PATENT DOCUMENTS

2022/0036302 A1* 2/2022 Cella .................. G06Q 10/0834
2023/0342684 A1* 10/2023 Cella ................ G06Q 10/06316

FOREIGN PATENT DOCUMENTS

| JP | 2019-8473 | 1/2019 |
| JP | 2019-532396 | 11/2019 |
| WO | 2014/016992 | 1/2014 |
| WO | 2018/097223 | 5/2018 |

OTHER PUBLICATIONS

Tang G, Asif S, Webb P. The integration of contactless static pose recognition and dynamic hand motion tracking control system for industrial human and robot collaboration. Industrial Robot: An International Journal. Aug. 17, 2015;42(5):416-28.*

Sylari A, Ferrer BR, Lastra JL. Hand Gesture-Based On-Line Programming of Industrial Robot Manipulators. In2019 IEEE 17th International Conference on Industrial Informatics (INDIN) Jul. 22, 2019 (vol. 1, pp. 827-834). IEEE.*

International Search Report issued Apr. 6, 2021 in corresponding International Application No. PCT/JP2021/005982.

* cited by examiner

FIG. 6
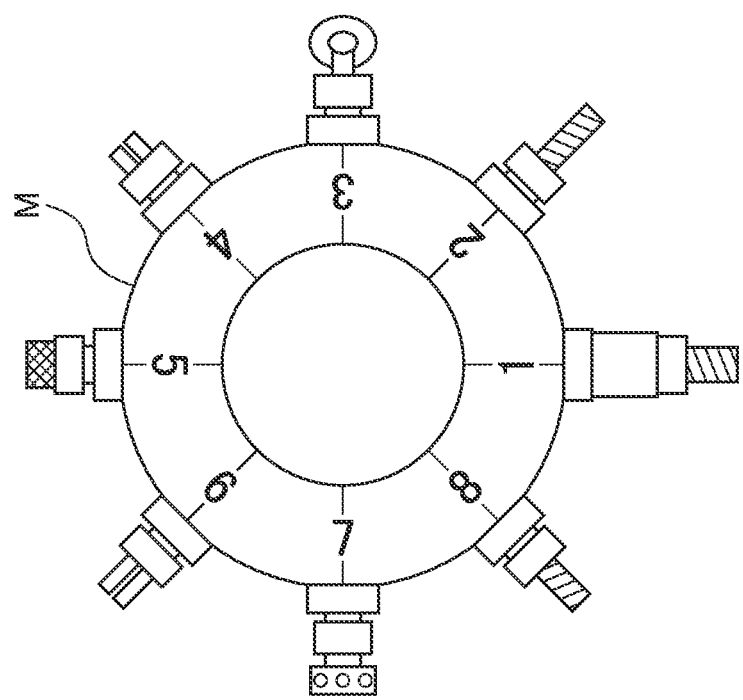
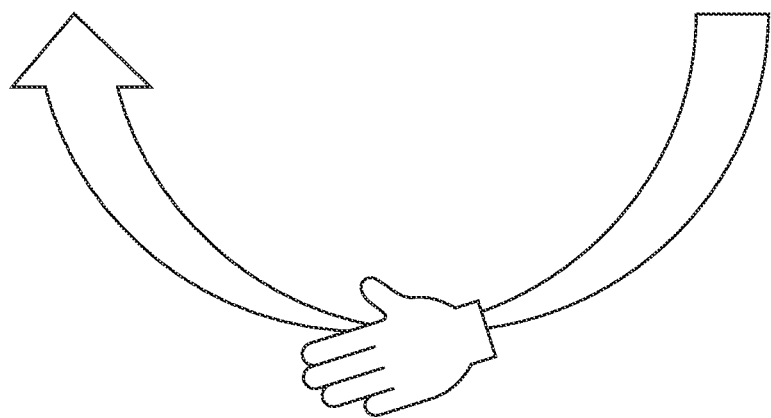

OPERATION SYSTEM FOR INDUSTRIAL MACHINERY

TECHNICAL FIELD

The present disclosure relates to an operation system for industrial machinery.

BACKGROUND ART

Recently, a mixed reality (MR) technology, in which real and virtual worlds are merged and the real things and virtual things affect each other, has been attracting attention. The mixed reality technology is used also in the field of industry (see Japanese Unexamined Patent Application, Publication No. 2019-008473, for example). By wearing a head mount display device of this technology and visually recognizing an industrial machine existing in a real space, it is possible to project a 3D model of the industrial machine in a virtual space. In that case, the wearer of the head mount display device can also visually recognize their own arms and legs, so that it is expected to achieve an intuitive operation of the industrial machine.

Patent Document 1 Japanese Unexamined Patent Application, Publication No. 2019-008473

DISCLOSURE OF THE INVENTION

Problems to be Solved by the Invention

However, currently, when operating an industrial machine, it is necessary to do the operation while watching an operator's board or panel, and it is not possible to do the operation intuitively while simultaneously watching the state of the industrial machine. Furthermore, even though it is possible to synchronize the real state and information of the virtual space by simply applying the mixed reality technology to the industrial machine, safety of the operation cannot be secured.

Therefore, it is desired to provide an operation system for industrial machinery, which is capable of intuitively and safely operating the industrial machinery by using the mixed reality.

Means for Solving the Problems

An aspect of the present disclosure is an operation system for industrial machinery, including: an information acquisition unit that acquires machine identification information corresponding to an industrial machine; a machine identification unit that identifies the industrial machine based on the machine identification information acquired by the information acquisition unit; a model projection unit that projects a model corresponding to the industrial machine identified by the machine identification unit into a virtual space; a distance-direction calculation unit that calculates a distance and a direction of a user observing the model, with respect to the model projected by the model projection unit; a gesture observation unit that observes a gesture of the user as an instruction from the user for the industrial machine identified by the machine identification unit; an instruction determination unit that determines whether the user can give the instruction based on the distance and the direction of the user calculated by the distance-direction calculation unit and the gesture of the user observed by the gesture observation unit; and an operation instruction unit that, when a determination result of the instruction determination unit is positive, operates the industrial machine specified by the machine identification unit based on the gesture of the user observed by the gesture observation unit.

Effects of the Invention

According to an aspect of the present disclosure, it is possible to operate the industrial machinery intuitively and safely by using the mixed reality.

BRIEF DESCRIPTION OF THE DRAWINGS

FIG. 6 is a front view of the model projected into the virtual space, which is a diagram illustrating a state when operating an industrial machine based on a gesture of the user;

PREFERRED MODE FOR CARRYING OUT THE INVENTION

Hereinafter, an operation system for industrial machinery according to an embodiment will be described with reference to the accompanying drawings.

Figure 1:
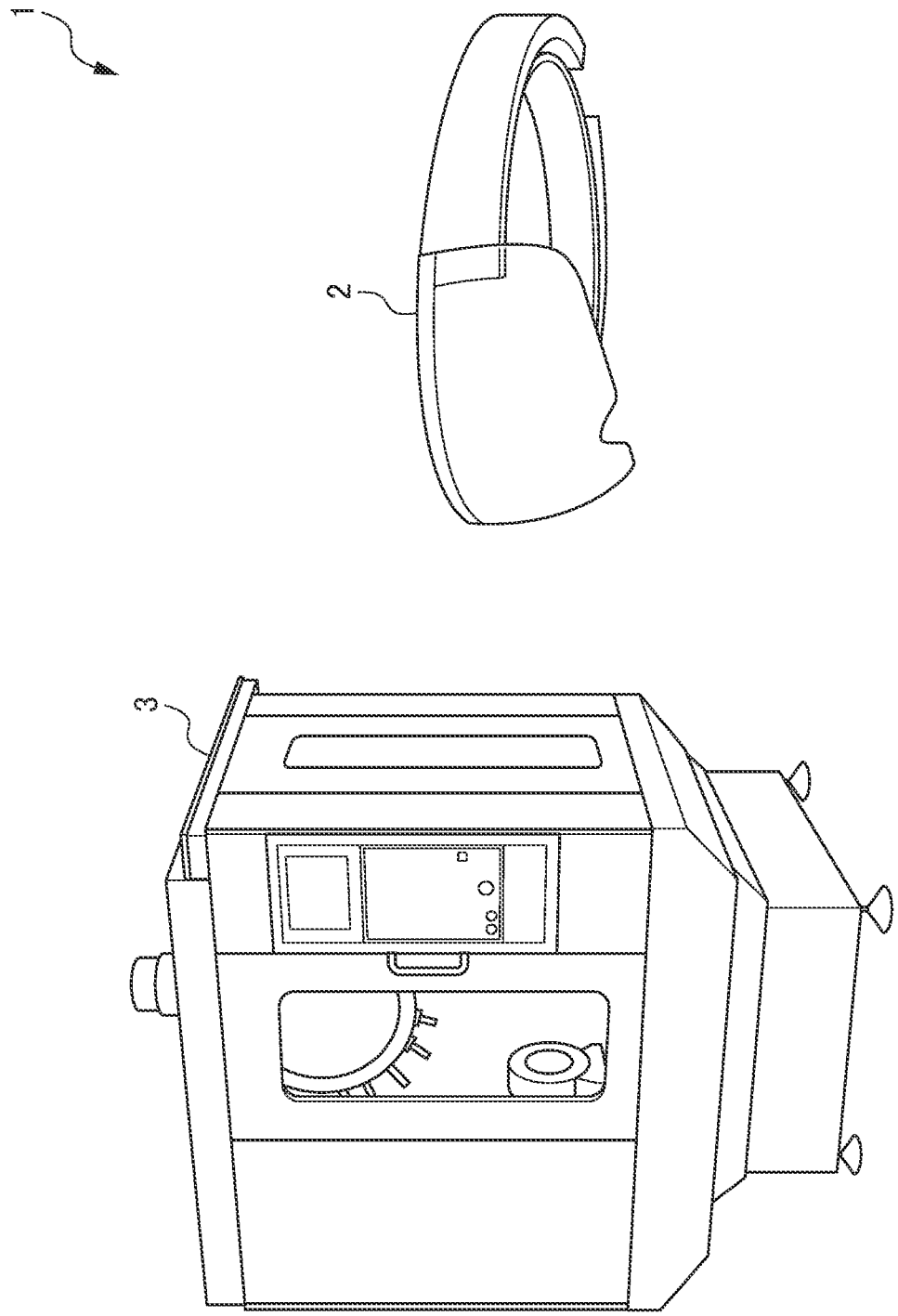
FIG. 1 is a schematic diagram illustrating an operation system for industrial machinery according to an embodiment.
Figure 2:
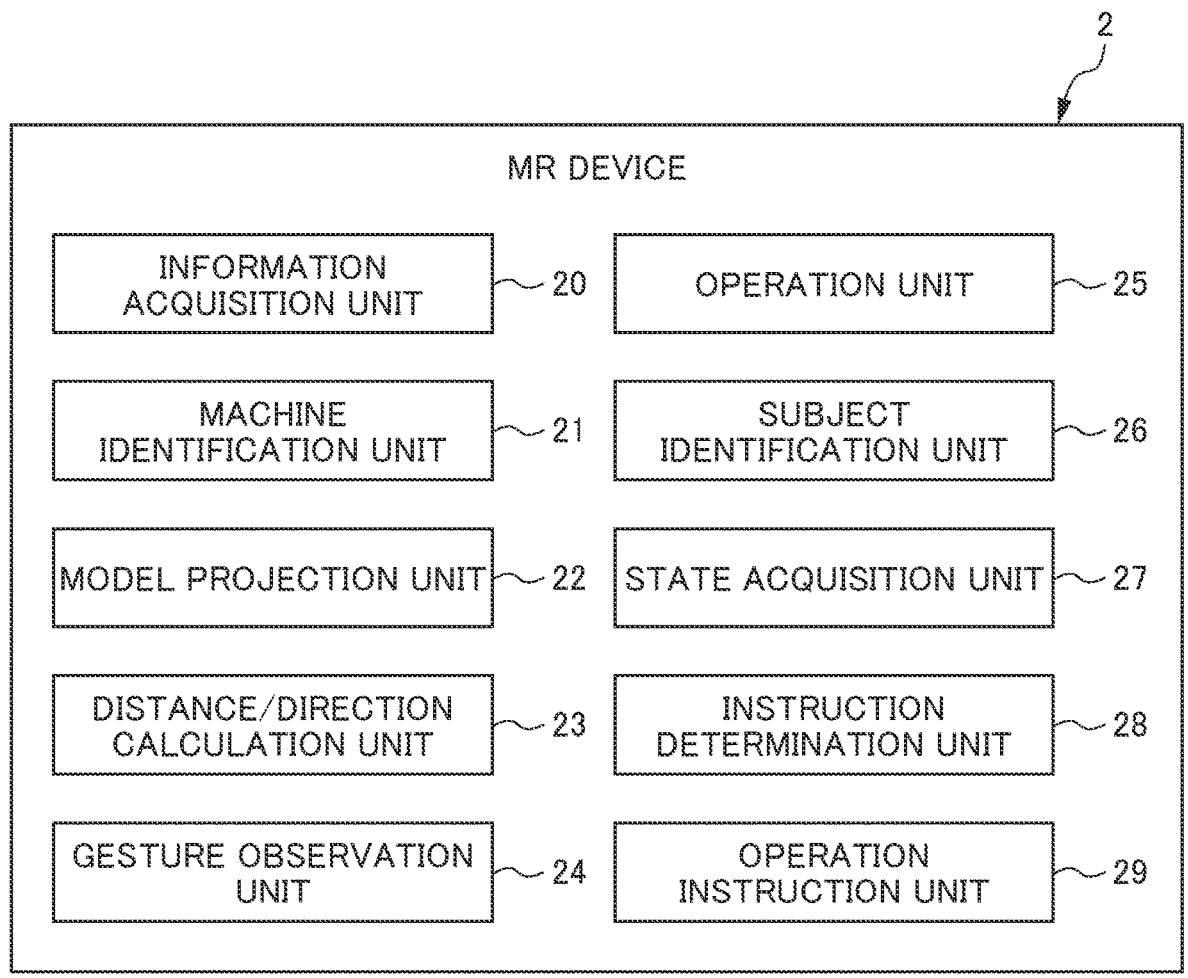
FIG. 2 is a functional block diagram of an MR device provided to the operation system for industrial machinery illustrated in FIG. 1.

First, the constitution of the operation system 1 for industrial machinery will be described by referring to FIG. 1 and FIG. 2. FIG. 1 is a schematic diagram of the operation system 1 for industrial machinery. FIG. 2 is a functional block diagram of an MR device 2 provided to the operation system 1 for industrial machinery.

The operation system 1 for industrial machinery illustrated in FIG. 1 is a system that operates an industrial machine 3 by using the MR device 2 to which the mixed reality (MR) technology is applied. That is, the operation system 1 for industrial machinery includes the MR device 2.

While the industrial machine 3 is not specifically limited, it is possible to use a machining center as illustrated in FIG. 1, for example. The industrial machine 3 configured with the machining center includes a turret as an automatic tool change device and, by automatically switching the tools by the turret, it is possible to perform various kinds of machining such as drilling, milling, boring machining, and the like.

The MR device 2 is a head mount display device worn by the user operating the industrial machine 3. Specifically, the MR device 2 includes input means such as a camera, output means that displays an image of mixed reality, communication means that communicates with the industrial machine 3, operation processing means such as a CPU (Central Processing Unit), auxiliary storage means such as an HDD (Hard Disk Drive) or an SSD (Solid State Drive) to which various kinds of programs are stored, and main storage means such as a RAM (Random Access Memory) for temporarily storing data that is required for the operation processing means to execute a program, all of which are not shown.

As illustrated in FIG. 2, the CPU provided to the MR device 2 executes various kinds of programs to achieve various kinds of functions by an information acquisition unit 20, a machine identification unit 21, a model projection unit 22, a distance-direction calculation unit 23, a gesture observation unit 24, an operation unit 25, a subject identification unit 26, a state acquisition unit 27, an instruction determination unit 28, an operation instruction unit 29, and the like.

The information acquisition unit 20 acquires machine identification information corresponding to the industrial machine 3. For example, as the machine identification information corresponding to the industrial machine 3, the information acquisition unit 20 uses the input means such as a camera to acquire a QR code (registered trademark) provided to the industrial machine 3 and feature points by pattern recognition of the industrial machine 3.

The machine identification unit 21 identifies the industrial machine 3 based on the machine identification information acquired by the information acquisition unit 20. Specifically, the machine identification unit 21 identifies what the real industrial machine 3 is based on the machine identification information acquired by the information acquisition unit 20 and data regarding the industrial machine, which is registered in advance and associated by corresponding to the machine identification information. Thereby, in the embodiment, for example, the machine identification unit 21 can identify that the industrial machine 3 is the machining center illustrated in FIG. 1.

The model projection unit 22 projects a model corresponding to the industrial machine 3 identified by the machine identification unit 21 into a virtual space. Specifically, the model projection unit 22 uses the output means such as a head mount display capable of displaying a mixed reality image to project, into the virtual space, a 3D model M (see FIG. 4 and the like to be described later) corresponding to the industrial machine 3 identified by the machine identification unit 21 such that the model M can be enlarged, reduced, and rotated. At this time, the model M projected into the virtual space by the model projection unit 22 is always linked to the real industrial machine 3 in the real space. Note that the industrial machine 3 identified by the machine identification unit 21 and the corresponding model M are included in the above-described data regarding the industrial machine, which is registered in advance and associated by corresponding to the machine identification information.

Furthermore, the model projection unit 22 projects the model M into the virtual space such that the subject identified by the subject identification unit 26 to be described later is emphasized. Specifically, the model projection unit 22 displays the operation subject identified by the subject identification unit 26 to be described later by emphasizing it with red, for example. This allows the user to recognize the operation subject.

Note that the model projection unit 22 creates a model of the industrial machine 3 based on images captured by cameras placed at each place, and may summon the created model into the virtual space. At this time, the images of the cameras are acquired by the information acquisition unit 20 as the machine identification information, and the machine identification unit 21 identifies what the real industrial machine is.

The distance-direction calculation unit 23 calculates the distance and the direction of the user observing the model M with respect to the model M projected by the model projection unit 22. In the head mount display, the distance and the direction of the user when projecting the model M into the virtual space are set values. That is, the distance and the direction of the user when the model M is projected into the virtual space are determined by the set values, and the distance-direction calculation unit 23 acquires the set values. Furthermore, when enlargement, reduction, or rotation of the model M is performed by the operation unit 25 to be described later, the distance-direction calculation unit 23 calculates the distance and the direction between the model M after being operated and the user based on the set values and the operation amount performed by the operation unit 25.

The gesture observation unit 24 observes the gesture of the user as an instruction from the user for the industrial machine 3 that is identified by the machine identification unit 21. Specifically, the gesture observation unit 24 uses the input means such as the cameras to observe the gesture of a prescribed user as an instruction from the user for the industrial machine 3 identified by the machine identification unit 21. The gestures of the prescribed user are registered in advance.

The operation unit 25 performs an operation including at least one selected from enlargement, reduction, and rotation of the model M projected by the model projection unit 22, based on the gesture of the user observed by the gesture observation unit 24. The gestures for the operation unit 25 to perform operations are set in advance as information, and such information is registered.

The subject identification unit 26 identifies the subject to be operated by the operation instruction unit 29 to be described later. Specifically, the subject identification unit 26 identifies the subject to be operated by the operation instruction unit 29 based on the input via the input means such as the camera, which is the gesture of the user observed by the gesture observation unit 24, for example. The gestures for the subject identification unit 26 to identify the subject are set and registered in advance as the information. Alternatively, the subject identification unit 26 identifies the subject to be operated by the operation instruction unit 29 based on the visual points of the user detected by a CCD camera or the like, not shown, provided to the head mount display. Furthermore, at the time of observing the gesture of the user by the gesture observation unit 24, if there is a target object part of the model M overlapping with a hand of the user, the subject identification unit 26 may identify the target object part as the subject to be operated. This will be described in detail at a latter part.

The state acquisition unit 27 acquires the state of the industrial machine 3 that is identified by the machine identification unit 21. Specifically, the state acquisition unit 27 uses the input means such as the camera to acquire the real state of the industrial machine 3 identified by the machine identification unit 21. Examples of the real state of the industrial machine 3 include presence or absence of alarm display, position of the turret, type of the tool mounted to the turret, and position of the spindle.

The instruction determination unit 28 determines whether the user can give an instruction based on the distance and the direction of the user calculated by the distance-direction calculation unit 23 and the gesture of the user observed by the gesture observation unit 24. In a case where it is necessary to consider the state of the industrial machine 3, the instruction determination unit 28 determines whether the user can give the instruction based on the distance and the direction of the user calculated by the distance-direction calculation unit 23, the gesture of the user observed by the gesture observation unit 24, and the state of the industrial machine 3 acquired by the state acquisition unit 27.

The conditions of the distance and the direction of the user with which the determination result of the instruction determination unit 28 becomes positive are set in advance as information, and the information is registered. Similarly, the condition of the gestures the instruction determination unit 28 determines as an instruction of the user is set in advance as information, and the information is registered. Each of those conditions will be described in detail in a latter part. Furthermore, the states of the industrial machine 3 with which the determination result of the instruction determination unit 28 becomes positive are set in advance as information, and the information is registered.

When the determination result of the instruction determination unit 28 is positive, the operation instruction unit 29 operates the industrial machine 3 identified by the machine identification unit 21 based on the gesture of the user observed by the gesture observation unit 24. The operation content of the industrial machine 3 corresponding to the gesture of the user is set in advance as information, and the information is registered. The state of the model M in the virtual space and the state of the industrial machine 3 in the real space are always linked via the communication means described above, thereby making it possible to operate the real industrial machine 3.

Figure 3:
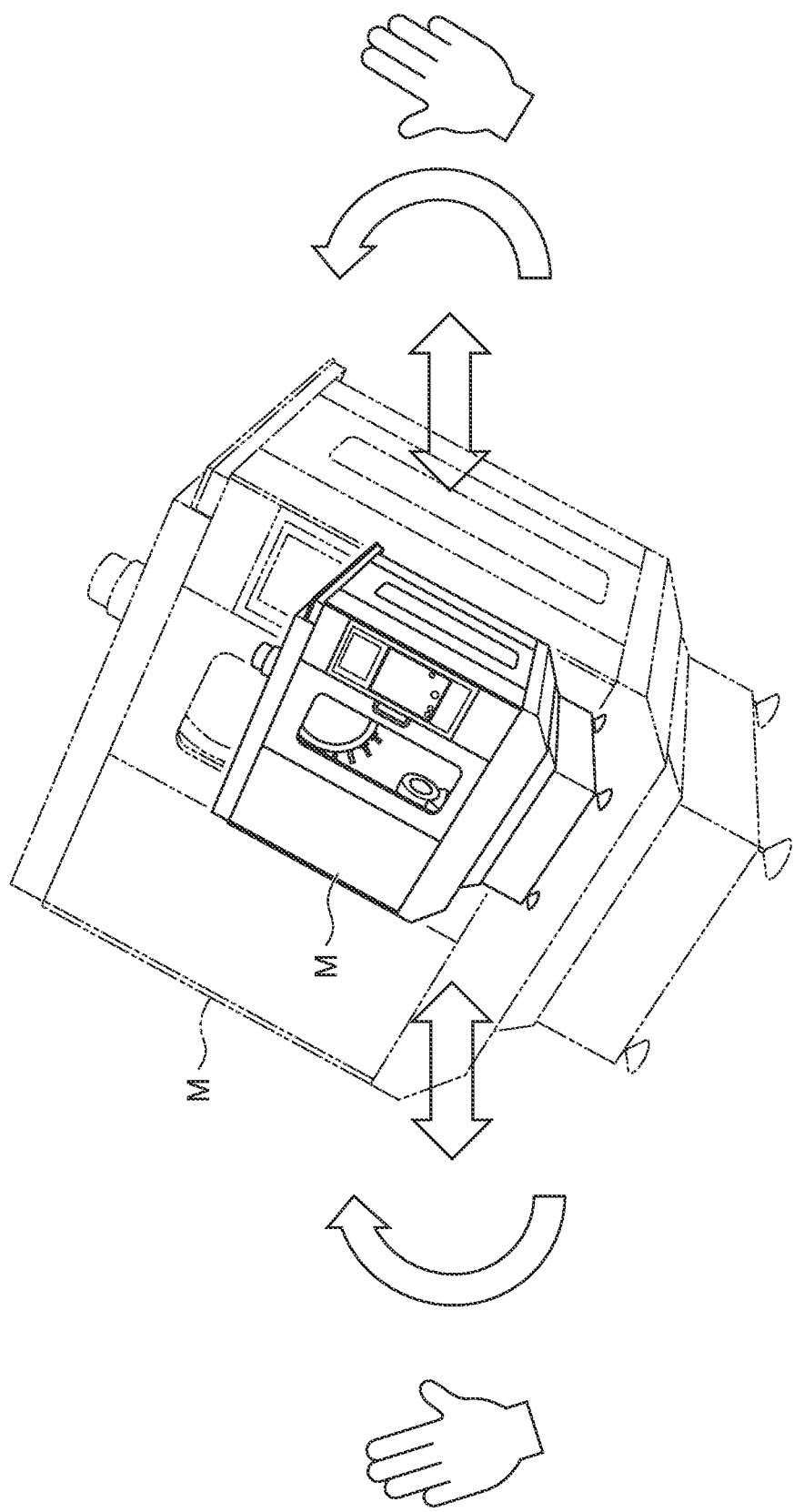
FIG. 3 is a conceptual diagram for describing enlargement, reduction, and rotation operations of a model projected into a virtual space.

Next, operations of enlargement, reduction, and rotation of the model M projected into the virtual space will be described by referring to FIG. 3. FIG. 3 is a conceptual diagram for describing the operations of enlargement, reduction, and rotation of the model M projected into the virtual space.

As illustrated in FIG. 3, based on the gesture of the user, an operation including at least one selected from enlargement, reduction, and rotation of the model M projected into the virtual space is performed. As illustrated in FIG. 3, the model M is displayed by being enlarged or reduced when the user widens or narrows the space between both hands, for example. Furthermore, when the user rotates both hands in a prescribed direction, for example, the model M is displayed by being rotated in the prescribed direction. That is, the user can operate and display the model M in the virtual space as desired. This makes it possible to perform the task on the model M projected in an arbitrary size different from the actual size, while viewing it from an arbitrary direction different from the actual viewing direction.

Figure 4:
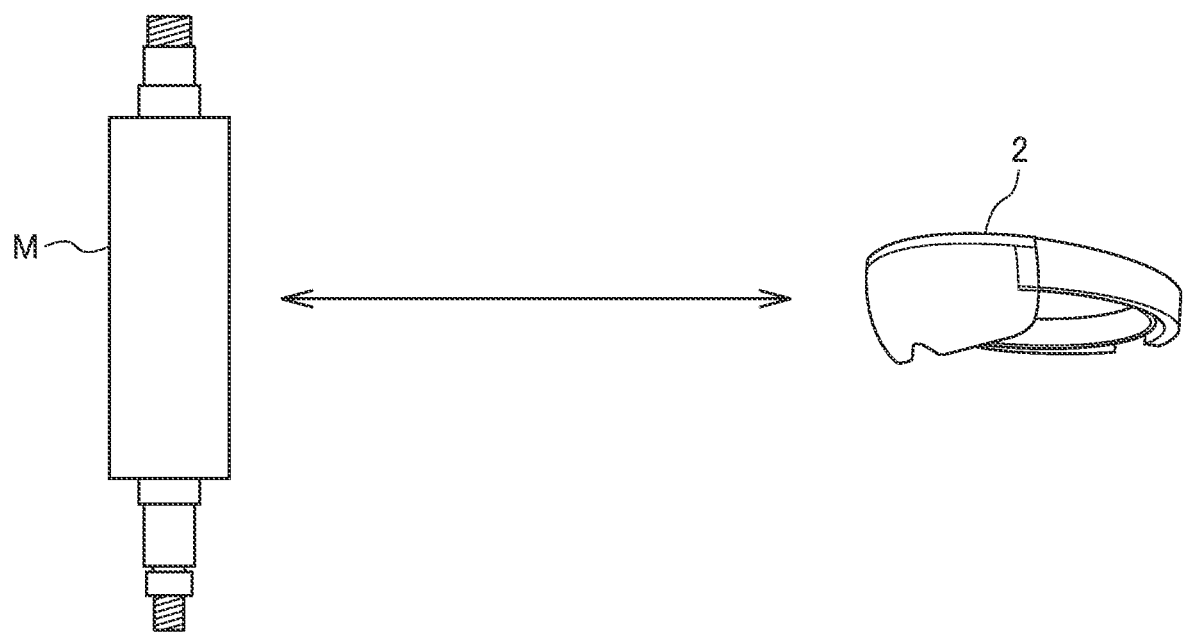
FIG. 4 is a conceptual diagram for describing distance and direction of the MR device with respect to the model projected into the virtual space.

Next, the distance and the direction of the user with respect to the model M projected into the virtual space will be described by referring to FIG. 4. FIG. 4 is a conceptual diagram for describing the distance and the direction of the user with respect to the model M projected into the virtual space. FIG. 4 illustrates the turret of the industrial machine 3 as the model M projected into the virtual space, and indicates the distance and the directions between the turret and the user (the MR device 2 in FIG. 4).

As for the operation for the turret such as a tool change operation, it is the condition (specific position condition) for operating the industrial machine 3 that the distance and the direction of the user with respect to the turret as the model M are within prescribed ranges. In that case, when the model M is projected in the same size (100%) as the actual size of the industrial machine 3, the distance that falls within the prescribed range is preferable to be between 1 m and 1.5 m inclusive. As for the direction that falls within the prescribed range, the angle from the front direction of the model M is preferable to be 15 degrees or less. When the model M is projected in a size enlarged or reduced with respect to the actual size of the industrial machine 3, the distance that falls within the prescribed range is preferable to be between (1×scaling percentage) m and (1.5×scaling percentage) m inclusive.

Figure 5A:
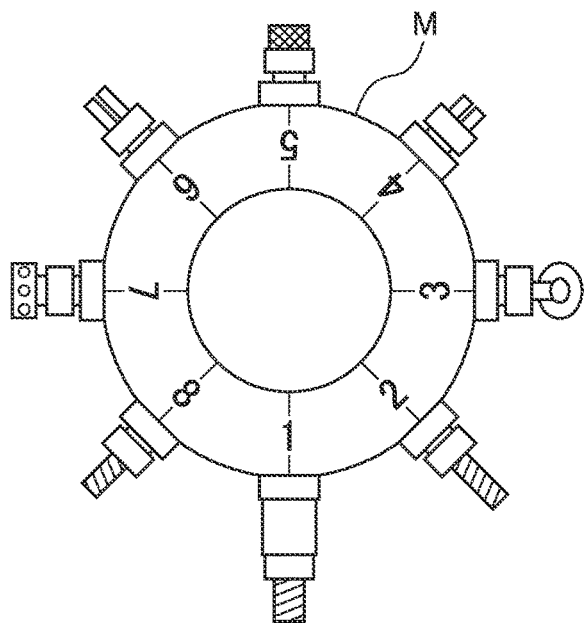
FIG. 5A is a front view of the model projected into the virtual space, which is a diagram illustrating a state before a subject to be operated is identified.
Figure 5B:
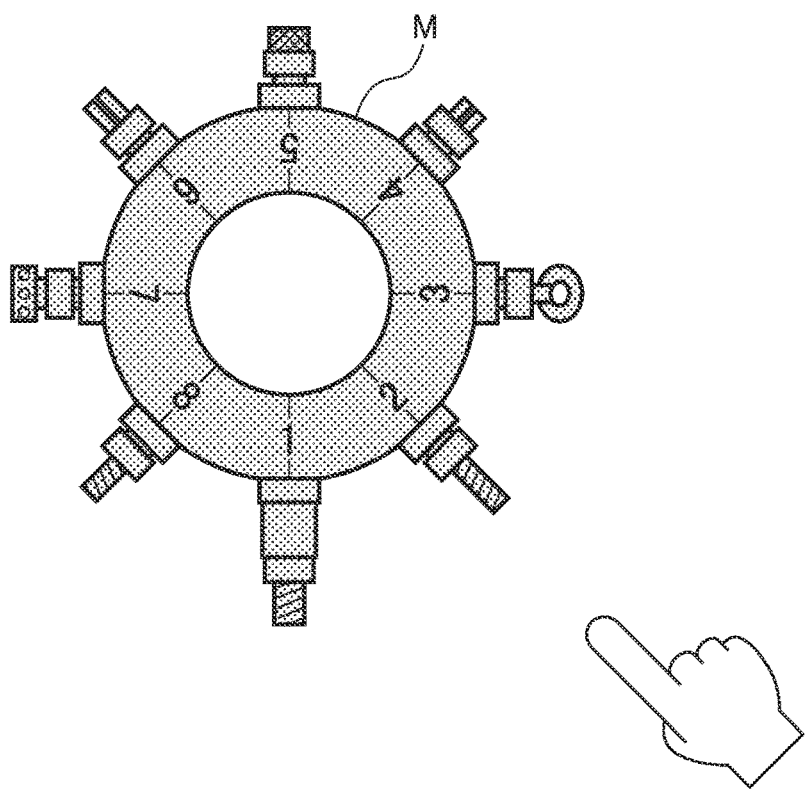
FIG. 5B is a front view of the model projected into the virtual space, which is a diagram illustrating a state after the subject to be operated is identified by a gesture of a user.

Next, a method for identifying the subject to be operated will be described by referring to FIG. 5A and FIG. 5B. FIG. 5A is a front view of the model M projected into the virtual space, which is a diagram illustrating a state before the subject to be operated is identified. FIG. 5B is a front view of the model M projected into the virtual space, which is a diagram illustrating a state after the subject to be operated is identified according to the gesture of the user. Note that the turret of the industrial machine 3 is illustrated in FIG. 5A and FIG. 5B as the model M projected into the virtual space.

As illustrated in FIG. 5A and FIG. 5B, when the user does a prescribed input while the model M is being projected into the virtual space, the subject to be operated is identified by the subject identification unit 26 and the identified subject is displayed by being emphasized as illustrated in FIG. 5B. Examples of the prescribed input may include not only the gesture such as pointing a finger to the subject as illustrated in FIG. 5B but also keeping the visual points on the subject for a prescribed length of time, and the like.

In a case of giving an instruction by a gesture of the user without identifying in advance the subject to be operated, the part the hand of the user is touching, that is, the target object part overlapping with the hand of the user may be identified as the subject to be operated. This method is effective when there are a plurality of operation subject parts existing from the visual points of the user.

Next, a method for operating the industrial machine 3 based on the gesture of the user will be described by referring to FIG. 6. FIG. 6 is a front view of the model M projected into the virtual space, which is a diagram illustrating a state when operating the industrial machine 3 based on the gesture of the user. Note that FIG. 6 illustrates the turret of the industrial machine 3 as the model M projected into the virtual space.

As illustrated in FIG. 6, when the model M is being projected into the virtual space, it is the condition for operating the industrial machine 3 (specific motion condition) that the user does a prescribed gesture. As a prescribed gesture for performing the tool change of the industrial machine 3, a gesture such as turning a steering wheel of a ship or the like is set in advance.

As described, when the specific position (the distance and the direction of the user with respect to the model M are within the prescribed ranges) and the specific motion condition (the user does the prescribed gesture) are both satisfied, the instruction determination unit 28 determines as positive. Thereby, it is possible to perform the tool change of the industrial machine 3 by the operation instruction unit 29. That is, when the distance of the user with respect to the model M is far, it is not possible to perform the tool change of the industrial machine 3 even if the user does the prescribed gesture. It is because the type of the tool cannot be specified from a distant position, and it is unsafe. This makes it possible to perform a tool change task intuitively and safely, by using mixed reality.

Figure 7:
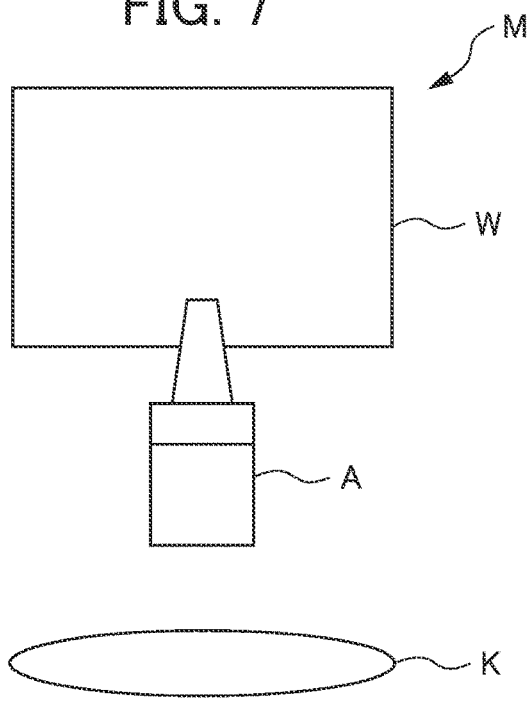
FIG. 7 is a top view of the model projected into the virtual space, which is a diagram illustrating a state where ranges of the distance and the direction of the user in which the user can give an instruction.
Figure 8:
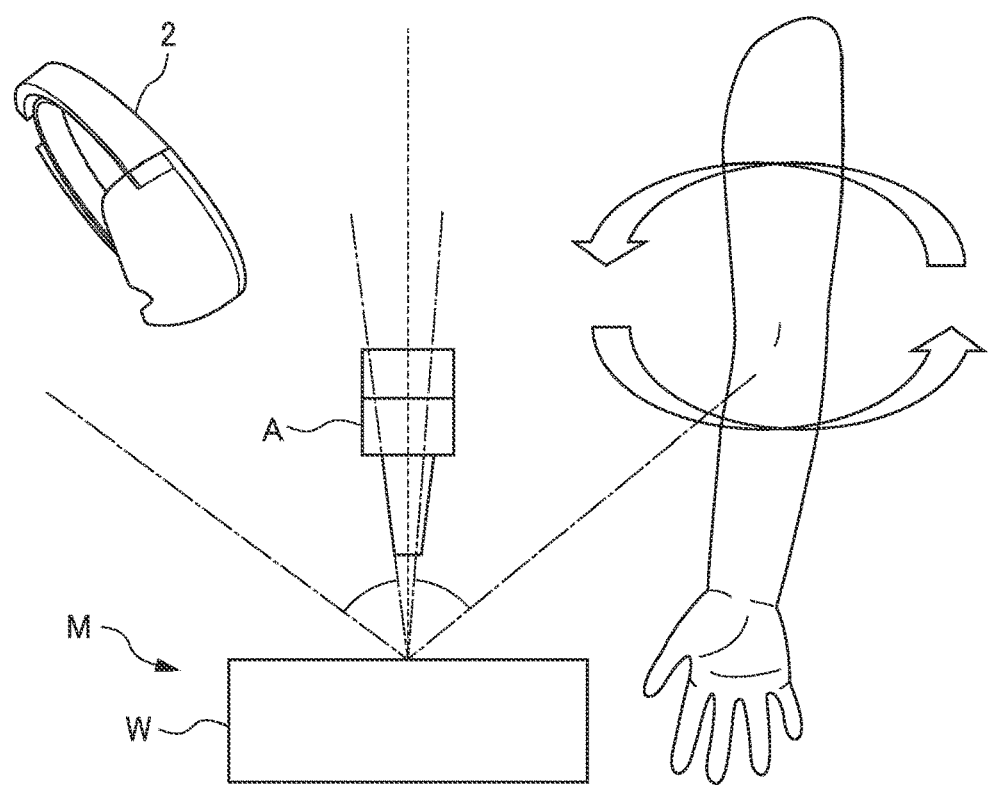
FIG. 8 is a conceptual diagram for describing the state of the model projected into the virtual space, which is a diagram illustrating a state when operating the industrial machine according to a gesture of the user.

Next, the method for operating the industrial machine 3 based on the gesture of the user will be described by referring to FIG. 7 and FIG. 8. FIG. 7 is a top view of the model M projected into the virtual space, which is a diagram illustrating a state where the range of the distance and the direction of the user in which the user can give an instruction is projected. FIG. 8 is a conceptual diagram for describing the state of the model M projected into the virtual space, which is a diagram illustrating a state where the industrial machine 3 is operated based on the gesture of the user. In FIG. 7 and FIG. 8, the workpiece W and a spindle A of the industrial machine 3 are illustrated as the model M projected into the virtual space.

Note here that in a machining program operation starting action for the industrial machine 3, the instruction determination unit 28 determines as positive when the state of the industrial machine 3 acquired by the state acquisition unit 27 satisfies the specific state condition in addition to satisfying the specific position condition and the specific motion condition, and the machining program operation for the industrial machine 3 is started by the operation instruction unit 29.

As illustrated in FIG. 8, as for the machining program operation starting action for the industrial machine 3, it is preferable, as the specific position condition, to be at the position where the angle from the straight line of the spindle A and the workpiece W as the model M falls within a range of 5 degrees or more, to 20 degrees or less. It is because the spindle A and the workpiece W can both be visually recognized thereby.

Furthermore, as the specific motion condition in such a case, a twisting and turning motion of the entire arm as illustrated in FIG. 8, for example, is set as the gesture to be done by the user.

Furthermore, as the specific state condition in such a case, it is preferable that there is no alarm display on the industrial machine 3, the position of the spindle A is the position capable of starting machining, and the like, for example. The range of the spindle A capable of starting machining may be projected into the virtual space by a marker K as illustrated in FIG. 7, for example.

As described above, the operation system 1 for industrial machinery includes: the information acquisition unit 20 that acquires the machine identification information corresponding to the industrial machine 3; the machine identification unit 21 that identifies the industrial machine 3 based on the machine identification information acquired by the information acquisition unit 20; the model projection unit 22 that projects the model M corresponding to the industrial machine 3 identified by the machine identification unit 21 into the virtual space; the distance-direction calculation unit 23 that calculates the distance and the direction of the user observing the model M, with respect to the model M projected by the model projection unit 22; the gesture observation unit 24 that observes the gesture of the user as an instruction from the user for the industrial machine 3 that is identified by the machine identification unit 21; the instruction determination unit 28 that determines whether the user can give the instruction based on the distance and the direction of the user calculated by the distance-direction calculation unit 23 and the gesture of the user observed by the gesture observation unit 24; and the operation instruction unit 29 that, when the determination result of the instruction determination unit 28 is positive, operates the industrial machine 3 identified by the machine identification unit 21 based on the gesture of the user observed by the gesture observation unit 24. This makes it possible to display the real industrial machine 3 in the virtual space as the model M, and operate the real industrial machine 3 by an operation of the user performed on the virtual space. More specifically, when the distance and the direction of the user calculated by the distance-direction calculation unit 23 satisfy the specific position condition set in advance and the gesture of the user observed by the gesture observation unit 24 satisfies the specific motion condition set in advance, it is determined that the user can give the operation instruction and the industrial machine 3 can be operated. Specifically, it is effective for the tool change operation of the industrial machine 3, for example. Therefore, according to the operation system 1 for industrial machinery, it is possible to operate the industrial machine 3 intuitively and safely by using mixed reality.

Furthermore, the operation system 1 for industrial machinery may be configured to include the operation unit 25 that performs an operation including at least one selected from enlargement, reduction, and rotation of the model M projected by the model projection unit 22, based on the gesture of the user observed by the gesture observation unit 24. Thereby, the model M in the virtual space can be operated by the operation unit 25 as desired, so that it is possible to have the real industrial machine 3, to which the state of the model M is always linked, do various kinds of actions.

Furthermore, the operation system 1 for industrial machinery may be configured to include the state acquisition unit 27 that acquires the state of the industrial machine 3 that is identified by the machine identification unit 21, and the instruction determination unit 28 determines whether the user can give the instruction based on the state of the industrial machine 3 acquired by the state acquisition unit 27. Thereby, the instruction determination unit 28 determines as positive when the state of the industrial machine 3 acquired by the state acquisition unit 27 satisfies the specific state condition in addition to satisfying the specific position condition and the specific motion condition, and the industrial machine 3 can be operated by the operation instruction unit 29. Specifically, it is effective for the machining program operation starting action for the industrial machine 3, for example.

Furthermore, the operation system 1 for industrial machinery may be configured to include the subject identification unit 26 that identifies the subject to be operated by the operation instruction unit 29. Thereby, the subject to be operated can be identified securely, so that it is possible to exhibit the above-described effects more securely.

Furthermore, in the operation system 1 for industrial machinery, the model projection unit 22 may be configured to project the model M such that the subject identified by the subject identification unit 26 is emphasized. Thereby, the user can securely recognize the operation subject visually, so that it is possible to exhibit the above-described effects more securely.

Note that the present disclosure is not limited by the embodiments described above but includes various changes and modifications within the range capable of achieving the object of the present disclosure. For example, while the embodiments above are described by referring to the case considering the machining center as the industrial machine, the industrial machine is not limited only to that. The operation system of the present disclosure can be applied to other machine tools, robots, and the like.

EXPLANATION OF REFERENCE NUMERALS

1 Operation system for industrial machinery
2 MR device
20 Information acquisition unit
21 Machine identification unit
22 Model projection unit
23 Distance-direction calculation unit
24 Gesture observation unit
25 Operation unit
26 Subject identification unit
27 State acquisition unit
28 Instruction determination unit
29 Operation instruction unit
3 Industrial machine
M Model
K Marker
A Spindle
W Workpiece

The invention claimed is:

1. An operation system for industrial machinery, the operation system comprising:
 an information acquisition unit that acquires machine identification information corresponding to an industrial machine;
 a machine identification unit that identifies the industrial machine based on the machine identification information acquired by the information acquisition unit;
 a model projection unit that projects a model corresponding to the industrial machine identified by the machine identification unit into a virtual space;
 a distance-direction calculation unit that calculates, in the virtual space, (i) a distance between a user observing the model and the model projected by the model projection unit, and (ii) and a direction of the user observing the model with respect to the model projected by the model projection unit;
 a gesture observation unit that observes a gesture of the user as an instruction from the user for the industrial machine identified by the machine identification unit;
 an instruction determination unit that determines whether the user can give the instruction based on the distance and the direction of the user calculated by the distance-direction calculation unit and the gesture of the user observed by the gesture observation unit; and
 an operation instruction unit that, when a determination result of the instruction determination unit is positive, operates the industrial machine specified by the machine identification unit based on the gesture of the user observed by the gesture observation unit.

2. The operation system for industrial machinery according to claim 1, further comprising an operation unit that performs an operation including at least one selected from enlargement, reduction, and rotation of the model projected by the model projection unit, based on the gesture of the user observed by the gesture observation unit.

3. The operation system for industrial machinery according to claim 1, further comprising a state acquisition unit that acquires a state of the industrial machine identified by the machine identification unit, wherein
 the instruction determination unit determines whether the user can give the instruction based on the state of the industrial machine acquired by the state acquisition unit.

4. The operation system for industrial machinery according to claim 1, further comprising a subject identification unit that identifies a subject to be operated by the operation instruction unit.

5. The operation system for industrial machinery according to claim 4, wherein the model projection unit projects the model such that the subject identified by the subject identification unit is emphasized.

* * * * *